(12) United States Patent
Morgan et al.

(10) Patent No.: US 6,981,184 B2
(45) Date of Patent: Dec. 27, 2005

(54) APPARATUS AND METHOD FOR PROCESSING A CORRUPTED FRAME

(75) Inventors: William K. Morgan, Marengo, IL (US); Alfredo Leanos, Chicago, IL (US); Donald P. Cordell, Woodstock, IL (US)

(73) Assignee: Motorola, Inc., Schaumburg, IL (US)

( * ) Notice: Subject to any disclaimer, the term of this patent is extended or adjusted under 35 U.S.C. 154(b) by 505 days.

(21) Appl. No.: 10/408,497

(22) Filed: Apr. 7, 2003

(65) Prior Publication Data

US 2003/0208715 A1 Nov. 6, 2003

Related U.S. Application Data

(60) Provisional application No. 60/371,850, filed on Apr. 11, 2002.

(51) Int. Cl.[7] .............................................. G06F 11/00

(52) U.S. Cl. ..................... 714/704; 714/758

(58) Field of Search ................. 714/758, 704, 714/755, 752, 746, 776, 786, 795, 796, 48, 714/49, 52; 375/240.27, 224, 225, 265

(56) References Cited

U.S. PATENT DOCUMENTS

| | | | |
|---|---|---|---|
| 4,688,207 A * | 8/1987 | Yoshimoto | 370/310 |
| 5,371,731 A | 12/1994 | Pratt et al. | |
| 5,422,893 A | 6/1995 | Gregg et al. | |
| 5,878,098 A | 3/1999 | Wang et al. | |
| 6,141,388 A * | 10/2000 | Servais et al. | 375/262 |
| 6,314,433 B1 | 11/2001 | Mills et al. | |
| 6,381,455 B1 * | 4/2002 | Smolik | 455/421 |
| 2003/0105625 A1 * | 6/2003 | Harris et al. | 704/201 |

* cited by examiner

*Primary Examiner*—Christine T. Tu

(57) ABSTRACT

An apparatus and method for processing a corrupted frame. The corrupted frame is analyzed to ascertain whether the rate can be determined. If the rate can be determined, steps for identifying the rate are executed. After the rate is identified, the method scans the corrupted frame by checking the MM/TT/TM or MM/FM bits (depending on the radio configuration) to determine whether signaling is present in the frame. If the scan finds potential signaling information, the BTS informs the transcoder of the frame rate, that signaling is present in the frame and that the outer CRC failed. The transcoder attempts to recover the signaling information based upon the inner CRC and discards the bearer information. If the signaling message is spread over multiple frames, the entire frame is discarded to avoid confusion when the signaling message has to be reassembled. The entire frame is also discarded if the inner CRC fails.

19 Claims, 3 Drawing Sheets

APPARATUS AND METHOD FOR PROCESSING A CORRUPTED FRAME

REFERENCE(S) TO RELATED APPLICATION(S)

The present application claims priority from provisional application, Ser. No. 60/371,850, entitled "APPARATUS AND METHOD FOR PROCESSING A CORRUPTED FRAME," filed Apr. 11, 2002, which is commonly owned and incorporated herein by reference in its entirety.

FIELD OF THE INVENTION

The present invention relates generally to communication systems and in particular to an apparatus and method for processing a corrupted frame.

BACKGROUND OF THE INVENTION

Currently, when a data frame is transmitted between a Mobile Station (MS) and a Base Transceiver Station (BTS), a rate determination algorithm running in the BTS determines the frame rate and whether the frame is usable or corrupted. The rate determination algorithm relies on the outcome of a traffic frame cyclic redundancy check (CRC) (also referred to as an outer CRC), SER/Total Metric and Quality bits. The actual payload of the frame itself is not considered in the rate determination process. All signaling messages contain a sixteen (16) bit CRC value (inner CRC) which is a stronger CRC than the outer CRCs used (typically 12, 10 and 8 bits). Currently, the inner CRC is not considered in determining whether the frame is corrupted. Signaling messages are usually in the form of dim and burst (partially voice, partially signaling) when transmitted on the fundamental channel. The signaling message with its 16 bit CRC is usually a small portion of the frame on the reverse link. If the bit errors that cause the rate determination algorithm to declare an erasure are not in the signaling portion of the message, the signaling portion of the frame can be recovered from the otherwise erased frame. However, currently when bits errors are detected in non-signaling portions of a frame, the entire frame is discarded.

FIG. 1 shows the format of a frame 100 transmitted over the Dedicated Control Channel/Fundamental Channel (DCCH/FCH). As specified in TIA/EIA/IS2000.2-A, the frame consists of Mixed Mode/Frame Mode (MM/FM) bits or Mixed Mode/Traffic Type/Traffic Mode (MM/TT/TM) bits, bearer bits, signaling bits, an outer CRC and tail bits. The signaling bits consist of a signaling message containing start of message (SOM) bits, message length, message body and an inner CRC. In current systems, a rate determination algorithm running in the BTS checks the outer CRC to determine whether a frame erasure has occurred. When the outer CRC indicates a corrupted frame, the entire frame is erased. As shown in FIG. 1, when there are no bits errors in the signaling message portion of the frame, the signaling message will still be erased based on the outer CRC check. This loss of signaling information can result in decreased system performance due to increased call setup time caused by increased retransmissions and reduced handoff success.

Thus, there is a need for an improved apparatus and method for processing a corrupted frame.

DETAILED DESCRIPTION OF THE PRESENTLY PREFERRED EMBODIMENT

Figure 2:
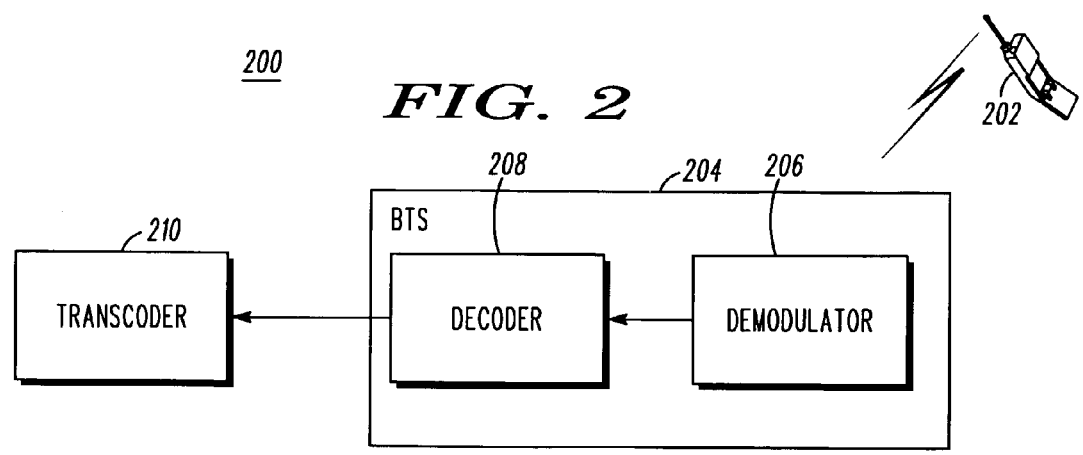
FIG. 2 is a block diagram of a simplified communication system that can implement the preferred embodiment of the present invention.

Referring to FIG. 2, a simplified block diagram of a communication system that can implement the preferred embodiment of the present invention is shown. In the system 200, a MS 202 transmits a frame over the DCCH or FCH to a BTS 204. In the BTS, the frame is processed by the demodulator as known in the art and sent to the decoder for processing. In accordance with the present invention, the decoder runs a method for processing a corrupted frame that determines whether there is a potential for signaling information to be recovered from the corrupted frame. If there is potential signaling information, the decoder signals a transcoder 210 to attempt recovery of the signaling information from the corrupted frame. Details of the MS 202, BTS 204 and transcoder 210 are not particularly relevant to the present invention and are not further discussed herein.

Figure 1:
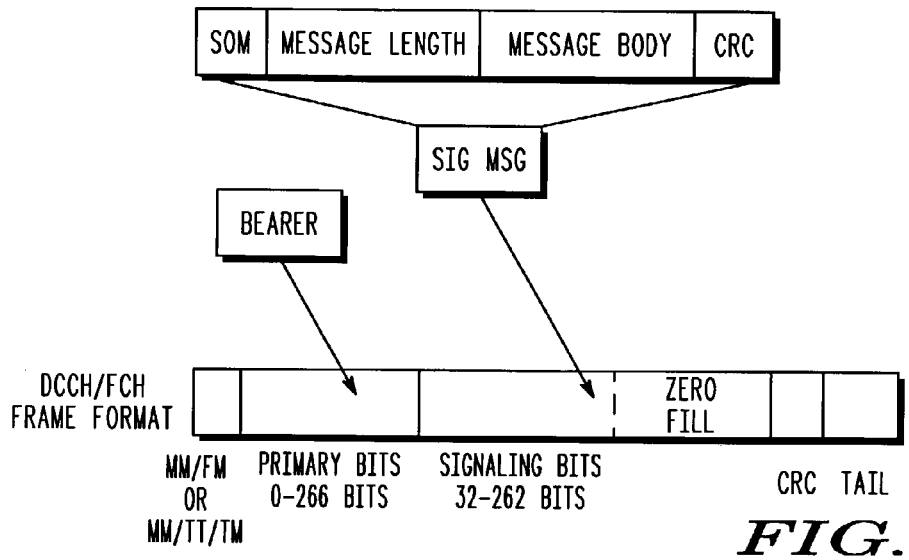
FIG. 1 is a diagram of a DCCH/FCH frame format in accordance with known art.
Figure 3:
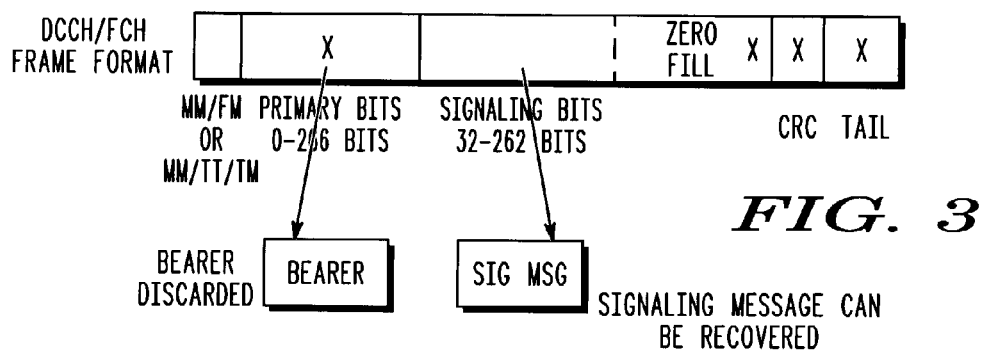
FIG. 3 is a diagram of a DCCH/FCH frame that has been transmitted over a noisy RF channel.

The method of the present invention scans corrupted frames for possible signaling messages. The success of recovering signaling messages relies on the probability that the first few bits of the frame (MM/FM or MM/TT/TM) are uncorrupted along with the signaling message itself. Referring to FIG. 3, a DCCH/FCH frame that has been transmitted over a noisy RF channel is shown. As shown, possible bit errors (designated by "X") exist in the primary bits, zero fill portion of the signaling bits, CRC and the tail bits of the frame. Any "X" in the frame results in an outer CRC failure. As stated previously, in current rate determination methods, the entire frame, including the signaling message, would be discarded based on failure of the outer CRC. In the method of the present invention, the inner CRC is checked and if it passes (no error bits found), recovery of the signaling message is possible. Because the outer CRC failed, the bearer bits are discarded.

In accordance with the present invention, a frame that is declared an erasure (corrupted frame) based on the outer CRC failure is analyzed to ascertain whether the corrupted rate can be determined. If the rate can be determined, steps for identifying the rate are executed. After the corrupted rate is identified, the method scans the corrupted frame by checking the MM/TT/TM or MM/FM bits (depending on the radio configuration) to determine whether signaling is present in the frame. If the scan finds possible signaling information, the BTS 204 informs the transcoder 210. The vast majority of signaling messages fit within a single frame. In the event the signaling message is spread over multiple frames, the preferred embodiment is to discard the entire frame to avoid confusion when the signaling message has to be reassembled at the transcoder 210. In some cases, the BTS could falsely detect a signaling message which could lead to complications during re-assembly. The vast majority of signaling messages fit within one frame. Thus, in the preferred embodiment, the method of the present invention, does not attempt to recover signaling messages longer in duration than one frame. This is done in order to avoid unnecessary complication of the method.

Figure 4A:
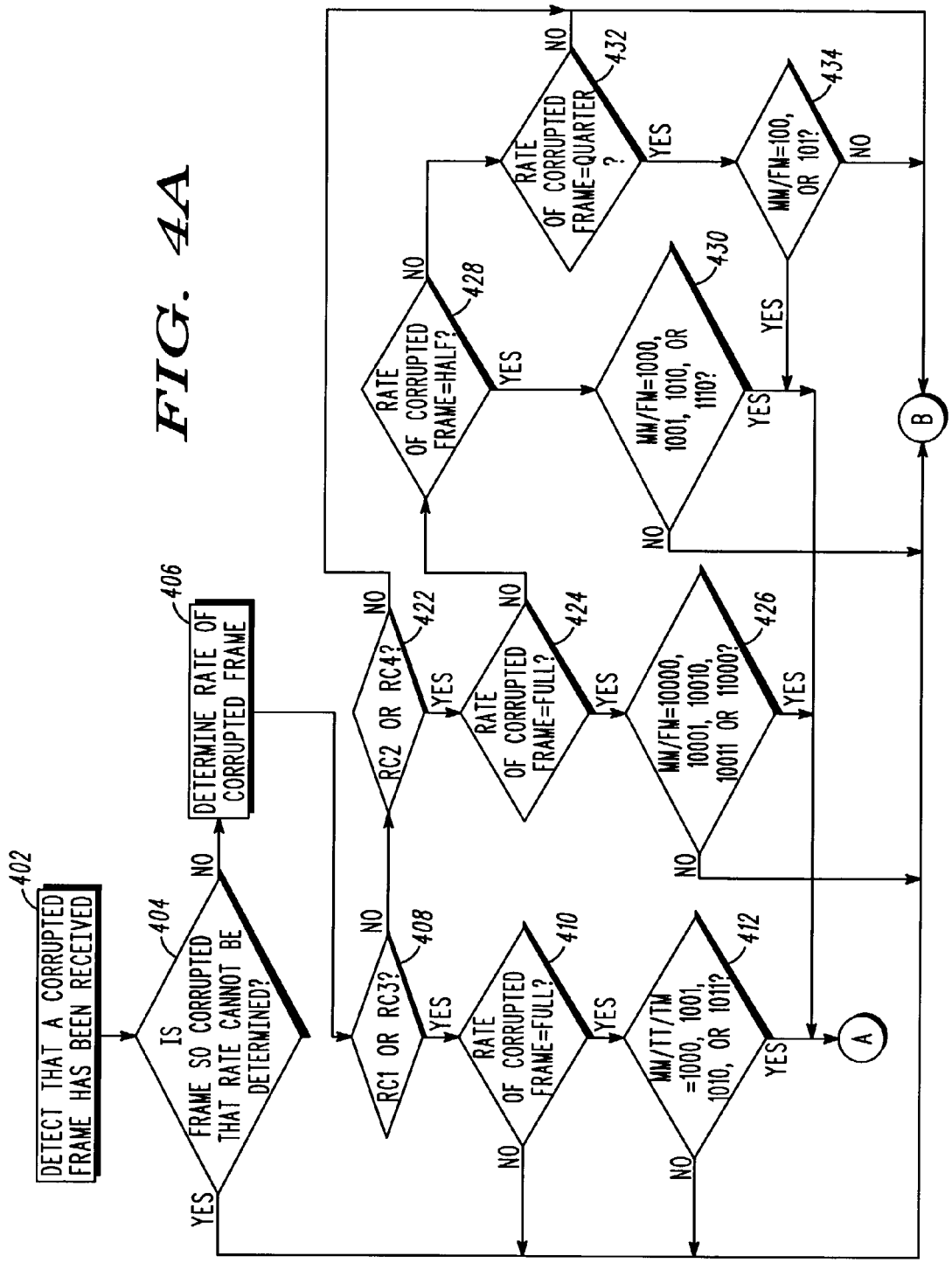
FIG. 4 is a flow diagram of the preferred embodiment of the method of the present invention.
Figure 4B:
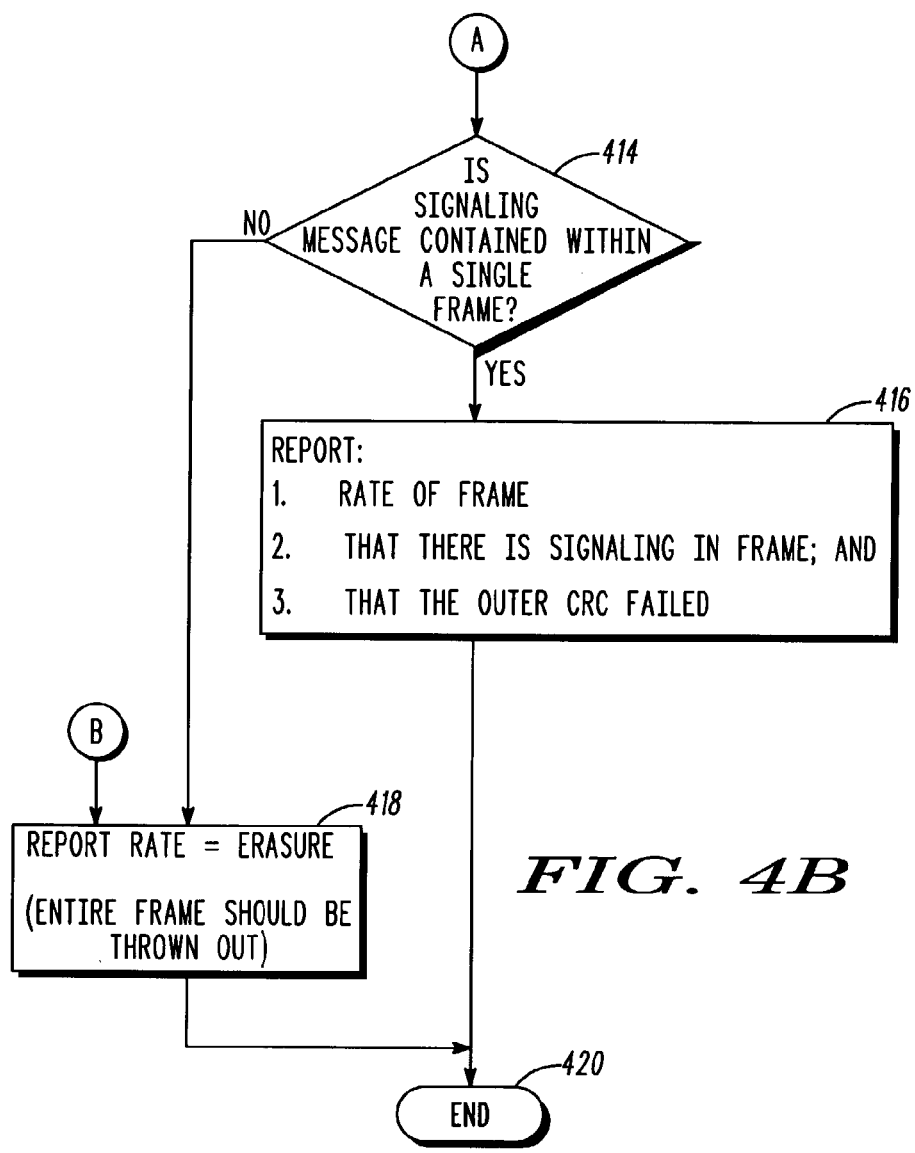
Figure 5:
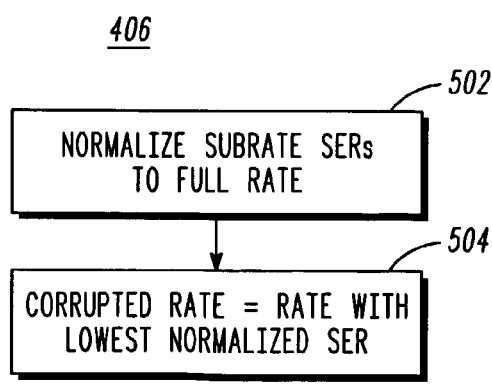
FIG. 5 is a flow diagram of one embodiment of detecting a corrupted frame in accordance with the method of FIG. 4.

Turning now to FIG. 4, the preferred embodiment of the method for processing a corrupted frame is shown. The method begins at step 402, where the BTS 204 detects that it has received a corrupted frame. At step 404, the method determines whether the frame is so corrupted that the rate cannot be determined. If the answer is yes, the method reports the frame rate as erasure (which signals that the entire frame should be discarded) (step 418) and the method ends (step 420). If the answer is no, the method determines the rate of the corrupted frame (step 406). In one embodiment, the method uses the steps of FIG. 5 to determine the rate. Referring to FIG. 5, the method first normalizes subrate symbol error rates (SERs) of the frame to full rate (step 502). Then, the method determines the rate of the corrupted frame to be the rate with the lowest normalized SER (step 504). In an alternate embodiment, the method can implement the method for rate determination as disclosed in FIG. 2 and the corresponding description of U.S. Pat. No. 5,878,098, entitled "Method and Apparatus for Rate Determination in a Communication System, issued on Mar. 2, 1999 to the owner of the present patent application (Motorola, Inc.), which is herein incorporated by reference.

Referring back to FIG. 4, after the rate of the corrupted frame has been determined, the method determines whether the radio configuration of the frame is radio configuration one (RC1) or radio configuration three (RC3) (step 408). If the radio configuration is one or three, at step 410 the method determines whether the rate of the corrupted frame (determined at step 406) is full. If the rate is full, the method determines whether the MM/TT/TM bits are equal to either of bit sequences 1000, 1001, 1010 or 1011. If the MM/TT/TM bits are equal to either of the bit sequences, there is potential signaling information in the corrupted frame and the method proceeds to step 414. At step 414, the method determines whether the signaling message is contained within a single frame. In the preferred embodiment, the method determines whether the start of message (SOM) equals "1" and whether the signaling message length is less than the frame length. If the answer is yes, the method reports the rate of the frame as full, that there is signaling in the frame; and that the outer CRC failed (step 416). Then, the method ends at step 420.

Referring back to step 410, because signaling is present only in full rate frames for RC1 and RC3, if the rate of the corrupted frame is not full, the method reports the frame rate as erasure (step 418) and ends (step 420). Referring back to step 412, if MM/TT/TM is not equal to 1000, 1001, 1010 or 1011 indicating that no signaling is present in the frame, the method reports the frame rate as erasure (step 418) and ends (step 420). Referring back to step 414, if the signaling message is not contained within a single frame, the method reports the frame rate as erasure (step 418) and ends (step 420).

Referring back to step 408, if the radio configuration is not RC1 or RC3, at step 422, the method determines whether the radio configuration is RC2 or RC4. If the radio configuration is neither RC2 nor RC4, the method reports the frame rate as erasure (step 418) and ends (step 420). If the radio configuration is either RC2 or RC4, the method determines whether the rate of the corrupted frame is full (step 424). If the rate of the corrupted frame is full, the method determines whether the MM/FM bits are equal to either of bit sequences 10000, 10001, 10010, 10011 or 11000. If the answer is no, the method reports the frame rate as erasure (step 418) and ends (step 420). If the MM/FM bits are equal to either of the bit sequences, there is potential signaling information in the corrupted frame and the method proceeds to step 414. At step 414, the method determines whether the signaling message is contained within a single frame. If the answer is yes, the method reports the rate of the frame as full, that there is potential signaling in the frame; and that the outer CRC failed (step 416). Then, the method ends at step 420.

Referring back to step 424, if the rate of the corrupted frame is not full, the method determines whether the rate is half (step 428). If the rate is half, the method determines whether the MM/FM bits are equal to either of bit sequences 1000, 1001, 1010 or 1110 (step 430). If the MM/FM bits are not equal to either of the bit sequences, the method reports the frame rate as erasure (step 418) and ends (step 420). If the MM/FM bits are equal to either of the bit sequences, there is signaling information in the corrupted frame and the method proceeds to step 414. At step 414, the method determines whether the signaling message is contained within a single frame. If the answer is yes, the method reports the rate of the frame as half, that there is signaling in the frame; and that the outer CRC failed (step 416). Then, the method ends at step 420.

Referring back to step 428, if the rate of the corrupted frame is not half, the method determines whether the rate is quarter (step 432). If the rate is not quarter, the method reports the rate as erasure (step 418) and the method ends (step 420). If the rate is quarter, the method determines whether the MM/FM bits are equal to either of bit sequences 100 or 101 (step 434). If the MM/FM bits are not equal to either of the bit sequences, the method reports the frame rate as erasure (step 418) and ends (step 420). If the MM/FM bits are equal to either of the bit sequences, there is potential signaling information in the corrupted frame and the method proceeds to step 414. At step 414, the method determines whether the signaling message is contained within a single frame. If the answer is yes, the method reports the rate of the frame as quarter, that there is potential signaling in the frame; and that the outer CRC failed (step 416). Then, the method ends at step 420.

In accordance with the preferred embodiment of the present invention, the information reported at steps 416 and 418 of FIG. 4 is used by the transcoder 210 of FIG. 2 in determining how to treat the received frame. Instead of treating the entire frame as an erasure (i.e. discarding the entire frame) because there are bit errors in portions of the frame other than the signaling information, the transcoder 210 can use the information at step 416 to attempt to recover the frame's signaling content, discard only primary or secondary traffic information (because the outer CRC failed) and instruct the MS 202 to increase the power for subsequent frame transmissions. The transcoder 210 uses the information at step 418 to discard the entire frame and instruct the MS to increase the power for subsequent frame transmissions. Discarded primary and secondary traffic frames are currently handled as erasures by the vocoder.

Preferably, the method of the present invention is stored in memory of the BTS 204 and transcoder 210 and runs on any computer or microprocessor commonly known in the art. The method results in potentially recovering signaling content in a corrupted frame that would otherwise be erased. The method improves the probability that a signaling message will be successfully transmitted to the BTS on the first attempt. This improvement can result in reduced call setup time due to fewer retransmissions, improved handoff success, less dropped calls and more successful originations. While the invention may be susceptible to various modifications and alternative forms, a specific embodiment has been shown by way of example in the drawings and has been described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A method of processing a corrupted frame comprising the steps of:
   detecting that a corrupted frame has been received;
   determining a rate of the corrupted frame;
   determining a radio configuration of the corrupted frame;
   using the radio configuration of the frame, rate of the frame and predetermined bits in the frame, determining whether signaling information is present in the corrupted frame;
   when signaling information is present in the corrupted frame, reporting the rate, that there is signaling present in the frame and that a frame cyclic redundancy check failed.

2. The method of claim 1 wherein the step of determining a rate of the corrupted frame comprises the steps of:
   determining whether the frame is so corrupted that a rate cannot be determined; and
   when the rate is not so corrupted that the rate cannot be determined,
      normalizing subrate system error rates of the frame to full rate;
      determining that the rate of the corrupted frame is equal to a lowest normalized subrate system error rate.

3. The method of claim 2 wherein the step of determining whether signaling information is present in the corrupted frame comprises determining whether the radio configuration is one of radio configuration one and radio configuration 3.

4. The method of claim 3 wherein the step of determining whether signaling information is present in the corrupted frame further comprises:
   determining whether the rate of the corrupted frame is full;
   when the rate of the corrupted frame is full, determining whether the predetermined bits equal one of 1000, 1001, 1010 and 1011; and
   when the predetermined bits equal one of 1000, 1001, 1010 and 1011, determining that there is signaling information in the frame.

5. The method of claim 4 wherein when the rate of the corrupted frame is not full, the method comprises:
   determining that signaling is not present in the corrupted frame; and
   reporting that the rate is erasure.

6. The method of claim 4 wherein the predetermined bits do not equal one of 1000, 1001, 1010 and 1011, the method comprises:
   determining that signaling is not present in the corrupted frame; and
   reporting that the rate is erasure.

7. The method of claim 2 wherein the step of determining whether signaling information is present in the corrupted frame comprises determining whether the radio configuration is either radio configuration two or radio configuration four.

8. The method of claim 7 wherein the step of determining whether signaling information is present in the corrupted frame further comprises:
   determining whether the rate of the corrupted frame is full;
   when the rate of the corrupted frame is full, determining whether the predetermined bits equal one of 10000, 10001, 10010, 10011 and 11000; and
   when the predetermined bits equal one of 10000, 10001, 10010, 10011 and 11000, determining that there is signaling information in the frame.

9. The method of claim 7 wherein the step of determining whether signaling information is present in the corrupted frame further comprises:
   determining whether the rate of the corrupted frame is half;
   when the rate of the corrupted frame is half, determining whether the predetermined bits equal one of 1000, 1001, 1010 and 1110; and
   when the predetermined bits equal one of 1000, 1001, 1010 and 1110, determining that there is signaling information in the frame.

10. The method of claim 7 wherein the step of determining whether signaling information is present in the corrupted frame further comprises:
    determining whether the rate of the corrupted frame is a quarter;
    when the rate of the corrupted frame is a quarter, determining whether the predetermined bits equal one of 100 and 101; and
    when the predetermined bits equal one of 100 and 101, determining that there is signaling information in the frame.

11. A method of processing a corrupted frame comprising the steps of:
    detecting that a corrupted frame has been received;
    determining a rate of the corrupted frame;
    determining a radio configuration of the corrupted frame;
    using the radio configuration of the frame, rate of the frame and predetermined bits in the frame, determining whether signaling information is present in the corrupted frame;
    when signaling information is present in the corrupted frame, determining whether the signaling information is contained within a single frame; and
    when the signaling information is contained within a single frame, reporting the rate, that there is signaling present in the frame and that a frame cyclic redundancy check failed.

12. The method of claim 11 wherein when the signaling information is not contained within a single frame, reporting the rate as erasure.

13. The method of claim 11 wherein the step of determining a rate of the corrupted frame comprises the steps of:
    determining whether the frame is so corrupted that a rate cannot be determined; and
    when the rate is not so corrupted that the rate cannot be determined,
       normalizing subrate system error rates of the frame to full rate;
       determining that the rate of the corrupted frame is equal to a lowest normalized subrate system error rate.

14. The method of claim 11 wherein the step of determining whether signaling information is present in the corrupted frame comprises
    determining whether the radio configuration is one of radio configuration one and radio configuration three;
    when the radio configuration is one of radio configuration one and radio configuration three 3, determining whether the rate of the corrupted frame is full;
    when the rate of the corrupted frame is full, determining whether the predetermined bits equal one of 1000, 1001, 1010 and 1011; and when the predetermined bits equal one of 1000, 1001, 1010 and 1011, determining that there is signaling information in the frame.

15. The method of claim 11 wherein the step of determining whether signaling information is present in the corrupted frame comprises:
   determining whether the radio configuration is one of radio configuration two and radio configuration four;
   when the radio configuration is one of radio configuration two and radio configuration four, determining whether the rate of the corrupted frame is full;
   when the rate of the corrupted frame is full, determining whether the predetermined bits equal one of 10000, 10001, 10010, 10011 and 11000; and
   when the predetermined bits equal one of 10000, 10001, 10010, 10011 and 11000, determining that there is signaling information in the frame.

16. The method of claim 11 wherein the step of determining whether signaling information is present in the corrupted frame further comprises:
   determining whether the radio configuration is one of radio configuration two and radio configuration four;
   when the radio configuration is one of radio configuration two and radio configuration four, determining whether the rate of the corrupted frame is half;
   when the rate of the corrupted frame is half, determining whether the predetermined bits equal one of 1000, 1001, 1010 and 1110; and
   when the predetermined bits equal one of 1000, 1001, 1010 and 1110, determining that there is signaling information in the frame.

17. The method of claim 11 wherein the step of determining whether signaling information is present in the corrupted frame further comprises:
   determining whether the radio configuration is one of radio configuration two and radio configuration four;
   when the radio configuration is one of radio configuration two and radio configuration four, determining whether the rate of the corrupted frame is a quarter;
   when the rate of the corrupted frame is a quarter, determining whether the predetermined bits equal one of 100 and 101; and
   when the predetermined bits equal one of 100 and 101, determining that there is signaling information in the frame.

18. A method of processing a corrupted frame comprising the steps of:
   receiving a rate of a corrupted frame;
   receiving notification that there is signaling in the corrupted frame;
   receiving notification that a traffic cyclic redundancy check failed;
   performing an inner cyclic redundancy check;
   when the inner cyclic redundancy check passes, recovering the frame's signaling content; and
   discarding the frame's bearer traffic content.

19. A storage medium having stored thereon a set of instructions which, when loaded into a microprocessor, causes the microprocessor to perform the following steps:
   detecting that a corrupted frame has been received;
   determining a rate of the corrupted frame;
   determining a radio configuration of the corrupted frame;
   using the radio configuration of the frame, rate of the frame and predetermined bits in the frame, determining whether signaling information is present in the corrupted frame;
   when signaling information is present in the corrupted frame, reporting the rate, that there is signaling present in the frame and that a frame cyclic redundancy check failed.

* * * * *